April 14, 1931. E. C. BULLARD ET AL 1,800,982
HYDRAULIC CHANGE SPEED GEAR MECHANISM
Filed Nov. 21, 1925 4 Sheets-Sheet 4

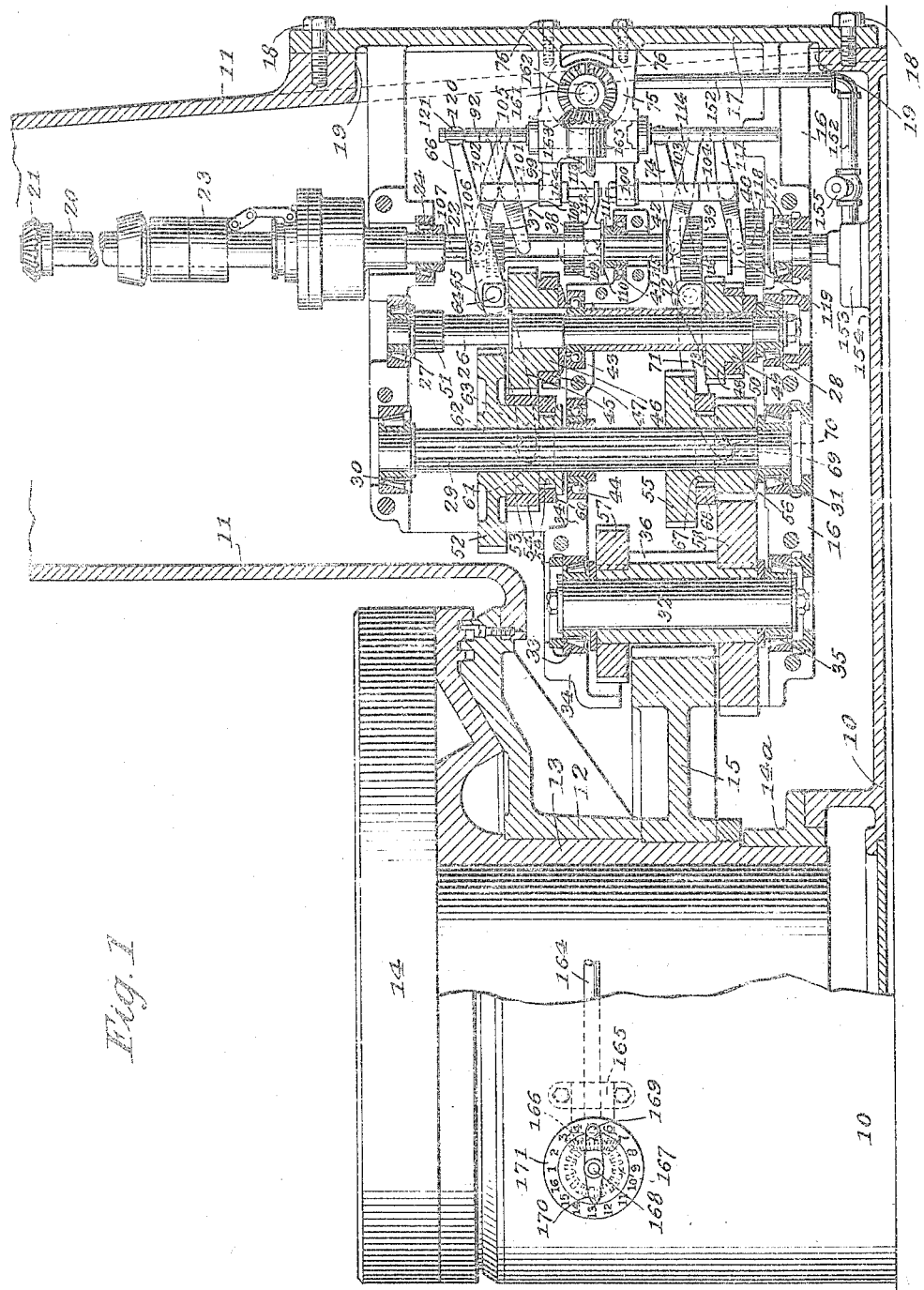

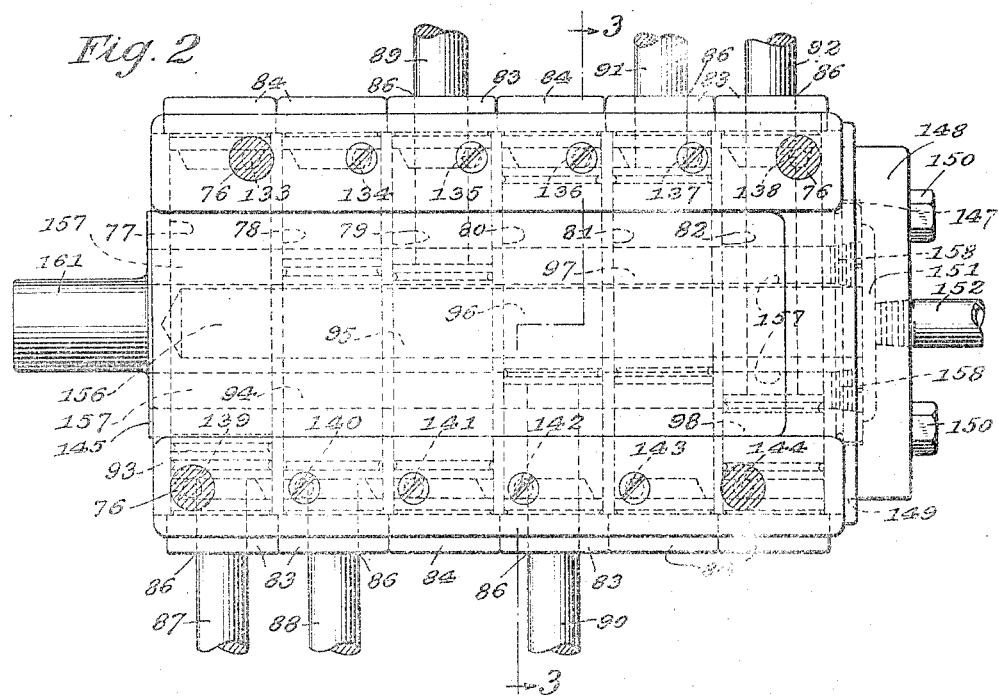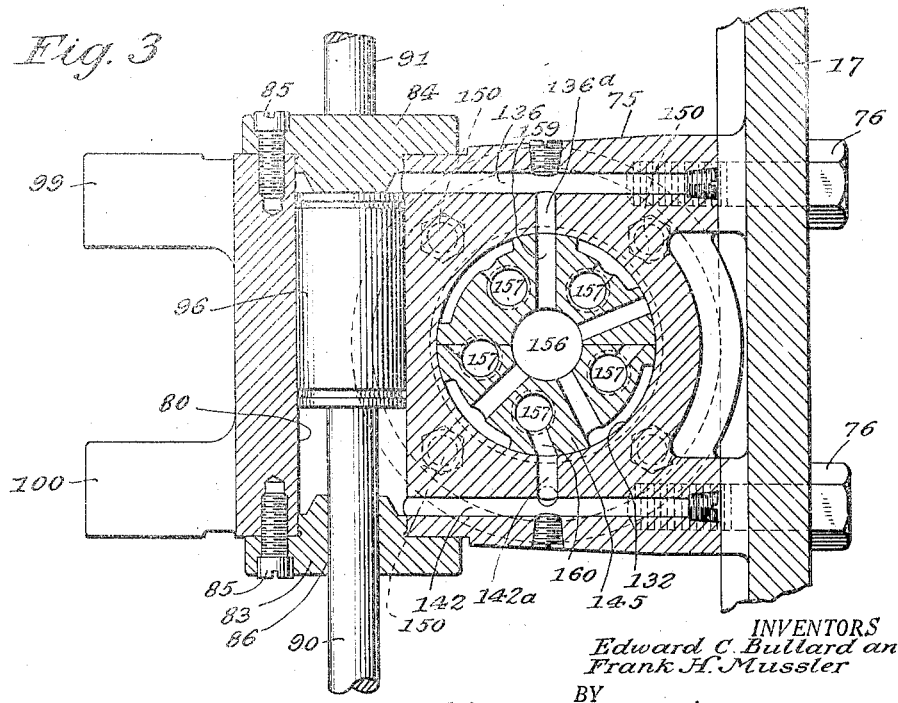

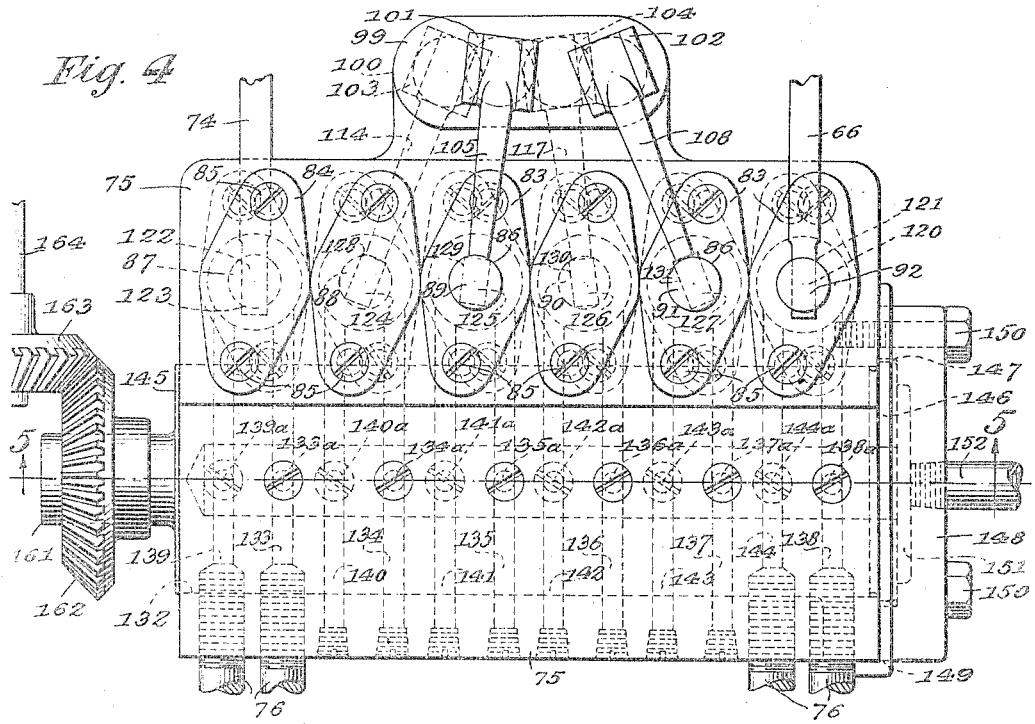
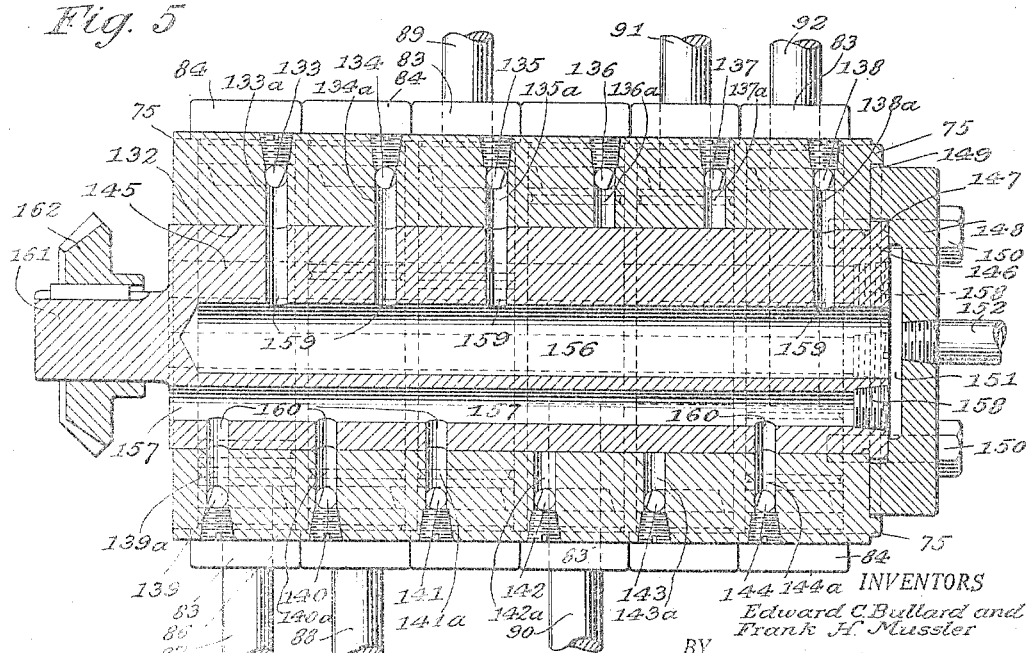

INVENTORS
Edward C. Bullard and
Frank H. Mussler
BY
Chamberlain & Newman
ATTORNEYS.

Patented Apr. 14, 1931

1,800,982

UNITED STATES PATENT OFFICE

EDWARD C. BULLARD, OF SOUTHPORT, AND FRANK H. MUSSLER, OF BRIDGEPORT, CONNECTICUT, ASSIGNORS, BY MESNE ASSIGNMENTS, TO THE BULLARD COMPANY, OF BRIDGEPORT, CONNECTICUT, A CORPORATION OF CONNECTICUT

HYDRAULIC CHANGE-SPEED GEAR MECHANISM

Application filed November 21, 1925. Serial No. 70,500.

The present invention relates to speed change mechanism and particularly a power operated mechanism for use in vertical turret lathes and other forms of machine tools and also with any other type of mechanism where the speed of the moving parts are adapted to be changed by shifting gears, for the purpose of increasing the speed or power as applied to the machine. The present disclosed embodiment of the invention is adapted for hydraulic operation.

An object of the invention is to provide a mechanism of this character by means of which change speed gears may be selectively shifted without the necessity of the operator actually moving the gears, and to this end it is proposed to provide a machine in which a dial or other suitable indexing means is provided, containing indications of the varying speeds and ratios of the gears, and which may be set at any desired position, whereupon the automatic means of the invention is adapted to shift the gears into the relation selected upon the dial.

A further object is to provide a mechanism which will be substantially instantaneous in operation and in which a plurality of gears may be simultaneously moved without interfering with each other.

A still further object is to provide a fluid pressure gear change means in which the flow of the fluid will be accurately controlled, and effectually retained against leakage, and to this end it is proposed in the present embodiment to provide a rotatable cylindrical valve member having a substantially fluid type bearing in a cylindrical valve chamber.

While the invention is illustrated in connection with a turret lathe, it will be understood that the invention may be applied to other types of machines, and also to automobiles.

With the above and other objects in view, an embodiment of the invention is shown in the accompanying drawings, and this embodiment will be hereinafter more fully described with reference thereto and the invention will be finally pointed out in the claims.

In the drawings:—

Fig. 1 is a vertical sectional view partly in side elevation of a turret lathe employing change speed gear shifting mechanism according to the present embodiment of the invention;

Fig. 2 is an enlarged side elevation of the piston and fluid pressure control valve means employed;

Fig. 3 is a sectional view thereof taken along the line 3—3 of Fig. 2;

Fig. 4 is a plan view of the same;

Fig. 5 is a longitudinal vertical sectional view taken along the line 5—5 of Fig. 4;

Similar reference characters indicate corresponding parts throughout the several figures of the drawings.

Figure 6:
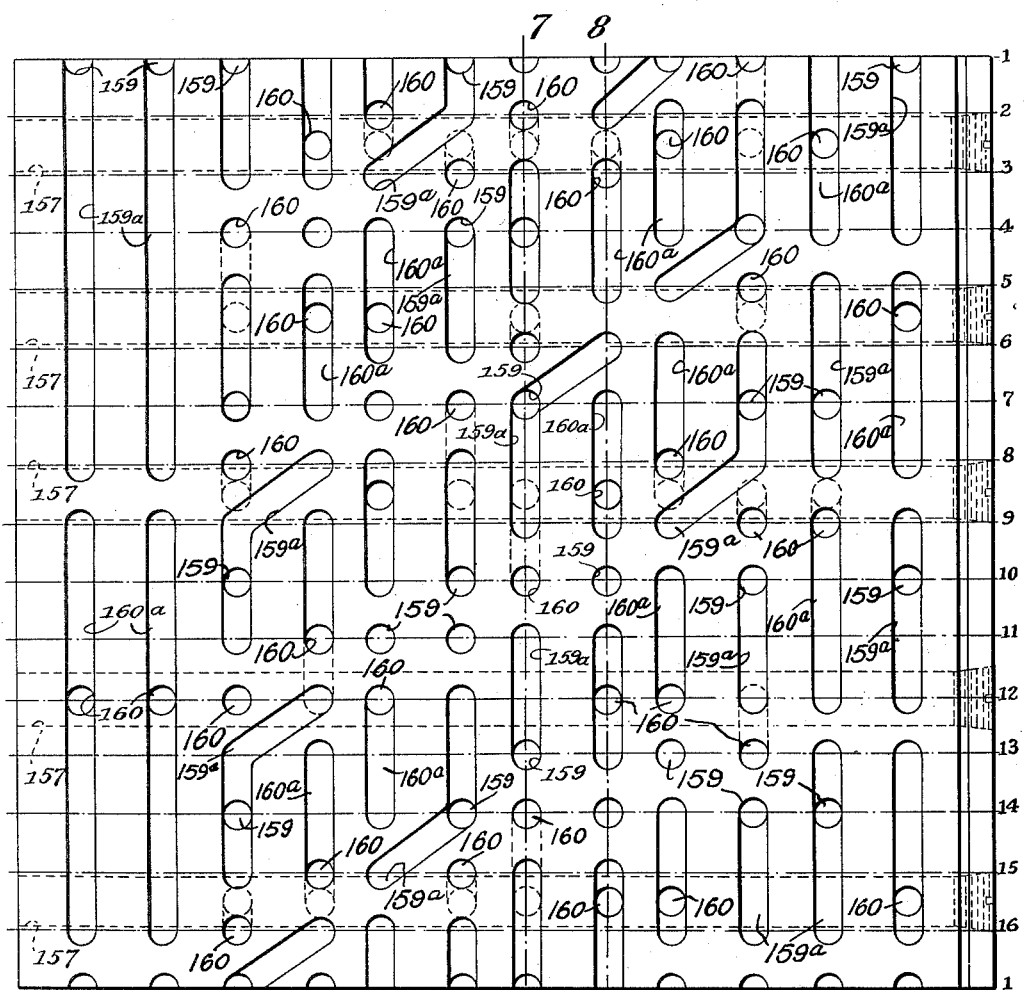
Fig. 6 is a developed plan view of the cylindrical surface of the control valve member.

Referring to the drawings and more particularly to Fig. 1 thereof, the vertical turret lathe shown by way of example comprises a base 10 bearing a vertical column 11 and a spindle bearing 12 disposed forwardly of the column and in which the vertical spindle 13 of the work carrying table 14 is rotatably supported, said spindle being further supported at its lower end in a cylindrical bearing 14ª of the base 10. A large gear 15 is secured upon the spindle 13 between the bearings 12 and 14ª and is adapted to be rotated at varying speeds by the change speed gear mechanism of the present invention, the particular speed depending upon the setting of the mechanism.

The change speed mechanism is mounted in the base 10 at the lower end of the column 11, and comprises a frame 16 removably supported in the base upon a plate 17 secured by bolts 18 over an opening 19 in the rear wall of the column 11, and whereby the mechanism may be conveniently slid into and over any place for change of gears or repairs.

The main drive shaft 20 of the machine is supported vertically in the column 11, being provided at its upper end with a beveled gear 21 adapted to be meshed with suitable driving mechanism in the superstructure of the machine, (not shown) and is connected to the drive shaft 22 of the change speed mechanism by means of a clutch 23, this clutch being connected during the normal operation of the machine.

The shaft 22 is rotatably mounted at its upper and lower ends in roller bearings 24 and 25 supported in the upper and lower walls of the frame 16, and between said bearings the shaft is splined for the purpose of forming a sliding and driving connection between it and the several gears carried thereon. Forwardly of the shaft 22 there is provided a vertical intermediate drive shaft 26, supported at its upper and lower end in roller bearings 27 and 28, mounted in the upper and lower walls of the frame 16, and forwardly of this shaft 26 there is provided a splined shaft 29, supported at its upper and lower ends in roller bearings 30 and 31, mounted in the upper and lower walls of the frame 16. These several shafts 22, 26 and 29 are adapted through meshing gears carried thereon to drive a vertical shaft 32 mounted at its upper end in roller bearings 33 secured in an intermediate bearing supporting wall 34 of the frame 16, and at its lower end in roller bearing 35 supported in the lower wall of the frame 16. The shaft 32 is provided with a pinion 36 which meshes with the gear 15 of the spindle 13 to drive the latter.

Upon the splined shaft 22 there are slidably mounted a series of four gears 37, 38, 39 and 40 of gradually increasing diameter, the gear 37 having the smallest number of teeth and the gear 40 the largest, and the gears being so spaced as to be slidable upon said shaft by the shifting mechanism hereinafter to be described. The splined shaft is supported intermediate its ends and between the gears 38 and 39 in a ball-bearing 41 mounted in a downwardly off-set extension 42 of the portion 34 of the frame. The shaft 26 and 29 being also similarly supported intermediate their ends by ball bearings 43 and 44 mounted in said portion 34 of the frame.

The shaft 26 is provided at a point above the bearing 43, and intermediate the gears 37 and 38 of the shaft 22, with a gear 45 keyed thereon and a diameter and pitch adapted to mesh with the gear 37 upon shifting of the latter, and upon a reduced portion 46 of said gear 45 there is secured a ring gear 47 of a diameter and pitch adapted to mesh with the gear 38 of the shaft 22 upon shifting of said gear 38. At the lower end of the shaft 26 there is provided a gear 48 keyed thereon and of a diameter and pitch adapted to mesh with the gear 39 of the shaft 22, and upon a reduced extension 49 of said gear 48 there is secured a ring gear 50 of a diameter and pitch adapted to mesh with the gear 40 of the shaft 22. It will thus be seen that by selectively shifting one or the other of the gears 37, 38, 39 and 40 into mesh with the respective gears 45, 47, 48 and 50 the shaft 26 may be driven at four different speeds with respect to the constant-speed of the shaft 22. At the upper end of the shaft 26 there is secured a pinion 51 adapted for driving the shaft 29 as will presently appear.

Upon the shaft 29 there is slidably splined a large gear 52 of such diameter and pitch as to mesh with the pinion 51 upon shifting of said gear to its raised position, as distinguished from the lowered position as illustrated in the drawings, and upon a reduced hub portion 53 of said gear 52 there is secured a ring gear 54 of a diameter and pitch adapted to mesh with the gear 45 of the shaft 26, the illustration showing this gear 54 in mesh. By shifting the gears 52 and 54 into mesh with the respective gears 51 and 45, the shaft 29 may be driven at two different speeds with respect to the shaft 26. The shaft 29, it will be seen, is driven at eight different speeds with respect to the shaft 22.

Upon the lower portion of the shaft 29 there is slidably splined a compound gear including a large diameter gear portion 55 and a small diameter gear portion 56, adapted to be respectively meshed with a gear 57 secured upon the upper end of the pinion 36 of the shaft 32 and a gear 58 secured to the lower end of said pinion. By shifting of the gears 55 and 56 into respective mesh with the gears 57 and 58, the pinion 36 is adapted to be driven at two different speeds with respect to the shaft 29, and therefore at sixteen different speeds with respect to the shaft 22.

The gear 52 of the shaft 29 is provided at the lower end of its hub portion 53 with an annular channel 59 in which there is loosely engaged a collar 60 provided at diametrically opposite points and beyond the periphery of the gear 54 with upwardly projecting lugs 61, to which there are pivotally connected at 62 the ends of a fork lever 63, pivotally mounted upon a shaft 64 supported in a suitable bearing 65 of the frame, and provided with a rearwardly projecting lever arm 66, rotation of this lever adapted to engage one or the other gears 52 and 54, with the respective gears 51 and 45. The collar 60 has limited lateral movement in the channel 59.

The gear 55 of the shaft 29 is also adapted to be shifted in a similar manner, and for this purpose is provided with an annular channel 67 in which there is loosely engaged for limited lateral movement a collar 68 provided at diametrically opposite points and beyond the periphery of the gear 56 with downwardly extending lugs 69, to which there are pivotally connected at 70 the forward ends of a fork lever 71, pivotally supported upon a shaft 72 mounted in bearings 73 of the frame, said lever being provided with a rearwardly projecting lever arm 74.

Rearwardly of the shaft 22 there is provided the mechanism for operating the shift levers, and which comprises a frame or block 75 supported upon the back plate 17 by screw bolts 76. The frame 75 is provided with a series of six vertical cylinders 77, 78, 79, 80, 81 and 82 closed at their respective ends by closure plates 83 and 84 secured to the frame by bolts 85, the closure plates 83 being provided with axial passages 86 in which are guided the piston rods 87, 88, 89, 90, 91 and 92 of pistons 93, 94, 95, 96, 97 and 98 movable in said cylinders, the rods 87, 88 and 90 extending downwardly while the rods 89, 91 and 92 extend upwardly. The pistons 94 to 97 (Figs. 2 and 5) are relatively long and of the same length, while the pistons 93 and 98 are relatively shorter, and whereby the latter have a movement considerably longer than the movement of the pistons 94 to 97, these pistons 93 and 98 adapted, as will be presently more fully pointed out, to be operated to shift the gears upon the shaft 29, while the pistons 94 to 97 are adapted to be operated to shift the gears 37, 38, 39 and 40 upon the shaft 22.

The frame 75 is provided at its inner side with spaced projecting bracket portions 99 and 100, the portion 99 supporting the vertical upwardly extending posts 101 and 102 and the portion 100 supporting vertical downwardly extending posts 103 and 104. Upon the post 101 there is pivotaly supported a yoke lever 105 provided at its ends with rollers 106 engaged in an annular channel 107 of the gear 37. Pivotally mounted upon the post 102 there is provided a yoke lever 108 having downwardly extending links 109 pivotaly connected at its yoke ends, and which are pivotally connected at their lower ends to a collar 110 rotatable in an annular channel 111 of the gear 38, said collar being provided with an apertured rearwardly projecting arm 112 slidably engaging upon a vertical guide post 113 secured to and depending from the bracket 99. This construction permits shifting of the gear 38 by swinging of the lever 108 without relative rotation of the collar 111 with respect to said gear. Upon the post 103 there is pivotally supported a yoke lever 114 provided at its yoke ends with rollers 115, engaged in an annular channel 116 of the gear 39, and pivotally mounted on the post 104 there is provided a yoke lever 117 provided at its yoke ends with rollers 118 engaged in an annular channel 119 of the gear 40.

As indicated in Fig. 4 the lever arms 66 and 74 are disposed in parallel and spaced relation to each other at each side of the levers 105, 108, 114 and 117, the lever 66 being provided with a circular end 120 engaged in a slot 121 in the upper end of the piston rod 92, while the lever 74 is provided with a circular end 122 engaged in a slot 123 in the lower end of the rod 87. The several levers 105, 108, 114 and 117 are disposed in radial relation to the axis of the shaft 22, and at their ends are respectively provided with circular portions 124, 125, 126 and 127 engaged in slots 128, 129, 130 and 131 of the respective piston rods 88, 89, 90 and 91.

Within the block or frame 75, and rearwardly of the vertical cylinders 77 to 82, there is provided a horizontally extending cylindrical chamber 132 within which a rotatable cylindrical valve member, hereinafter more fully referred to, is engaged. The block 75 is provided at the upper ends of the vertical cylinders and substantially tangential to one side thereof with lateral ports 133, 134, 135, 136, 137 and 138 extending above the cylindrical chamber 132 and respectively connected thereto by vertical ports 133ª to 138ª, and at the lower ends and substantially tangential to the other side with lateral ports 139, 140, 141, 142, 143 and 144 extending below the chamber 132 and connected thereto by vertical ports 139ª to 144ª disposed in the vertical plane of the vertical ports 133ª to 138ª and being diametrically opposed thereto, as clearly indicated in Fig. 3.

The cylindrical rotatable valve member 145 is engaged in the chamber 132 and is provided at one end with a flange 146 engaged within an annular recess 147 of a header plate 148 secured upon the end of the block 75 within a flanged recess 149 by screw bolts 150. The plate 148 is provided at its inner side with a chambered recess 151, and has centrally engaged therein one end of a fluid pressure feed pipe 152 extending downwardly into the base 10 and connected at its lower end with a fluid pressure pump 153, the gear of which is mounted upon the lower end of the main drive shaft 20, so that a continuous constant pressure is maintained during the operation of the machine. The pump is adapted to contain a fluid pressure medium as oil, which is returned by gravity after use in the cylinders to the reservoir 154 in the base 10 where it flows into the pump resting in said reservoir. An adjustable valve 155 is provided in the pipe 152 for controlling the pressure, or cutting off the flow of fluid to the cylinders when desired.

The valve 145 is provided with a central longitudinally extending passage or chamber 156 closed at one end and open at its other end to the pressure chamber 151 of the header plate 148, and in radially spaced surrounding relation to the passage 156 there are provided a plurality of longitudinally extending passages 157 closed at their ends adjacent the open end of the passage 156 by screw plugs 158 and open at their other ends. In annularly aligned relation with the upper and lower cylinder ports 133ª to 138ª and 139ª to 144ª the valve member is provided with passages 159 communicating with the central inlet passage 156 and with passages 160 connecting with the outlet passages 157, these passages 159 and 160 being connected in most cases to annular segmental grooves 159ª and 160ª in the periphery of the valve member, so that a single passage will serve to establish communication with the annularly aligned cylinder port in a plurality of predetermined positions of the valve member.

Figures 7, 8:
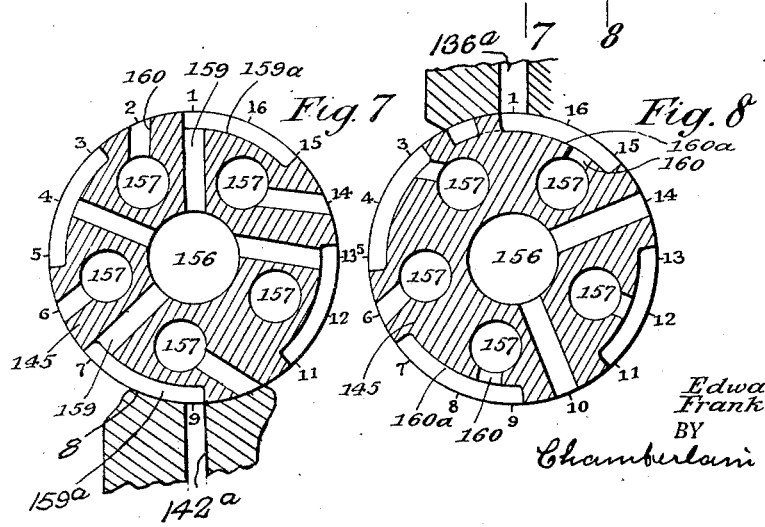
Fig. 7 is a transverse sectional view taken along the line 7—7 of Fig. 6.
Fig. 8 is a similar sectional view taken along the line 8—8 of Fig. 6.

According to the present embodiment there are sixteen different speed arrangements of the gearing, and therefore sixteen different adjustments of the valve member, as indicated in Figs. 6, 7 and 8. In any one of these positions either the upper or lower port of every cylinder is in communication with the pressure inlet passage 156, and the other port is in communication with one of the outlet passages 157, so that if the upper port of the fourth cylinder, for instance, is in communication with the passage 156 as shown in Fig. 5, the piston in this cylinder is moved downwardly, the fluid below the piston being forced through the lower port to one of the passages 157 from which it flows by gravity to the reservoir 154 and into the pump 153, from which it is again circulated to the passage 156. As shown in the developed plan (Fig. 6) each cylinder is controlled by two annular rows of passages to the inlet and outlet passages 156 and 157, the first row controlling the lower port of the first cylinder and the second row controlling the upper port of this cylinder, the third row controlling the lower port of the second cylinder and the fourth row controlling the upper port of this cylinder, etc. At the right of Fig. 6 the numerals 1 to 16 indicate the several positions of adjustment of the valve 145, while the letters a to l indicate the circumferential lines of the valve ports coinciding with the cylinder ports, the lines b, d, f, h, j and l coinciding with the upper cylinder ports 133ª to 138ª, and the lines a, c, e, g, i and k coinciding with the lower cylinder ports 139ª to 144ª.

The sectional views (Figs. 7 and 8) illustrate the valve passages for controlling the lower and upper ports of the fourth cylinder. Thus in the No. 1 position, the lower port 142ª (Fig. 7) is in communication at the diametrically opposed point 9 with the inlet passage 156, while the upper port 136ª (Fig. 8) is in communication at the point 1 with an outlet passage 157, so that the piston is moved to its upper position. In the No. 2 position, the lower port (Fig. 7) will be in communication at the point 10 with the outlet passage 157 while the upper port (Fig. 8) will be in communication at the point 2 with the inlet passage 156, and the piston will be moved to its lower position.

It will be noted that in this instance the passage 159ª extends diagonally to a passage 159 in the next annular row, this being merely a desirable arrangement to prevent interference of the passages. In the No. 1 position, just described, it will be understood that the ports for controlling the first, second and third, and the fifth and sixth pistons are in such relation to the upper ports 133ª, 134ª, 135ª, 137ª, and 138ª and the lower ports 139ª, 140ª, 141ª, 143ª and 144ª, that these pistons are either raised or lowered depending upon the particular gear arrangement desired. Thus, the lower port 139ª of the first cylinder is in communication at the point 9—diametrically opposed in position 1 to the point 1—through the valve port 160 and its circumferential extension 160ª with the outlet passage 157, while the upper port 133ª is in communication at the point 1 through the port 159 and its circumferential extension 159ª with the inlet passage 156, and the piston 93 of the first cylinder is therefore forced to its lower position. The arrangement of the control ports for the first cylinder is such, in the present embodiment, that in position 1 to 8 the upper port 133ª is in communication with the inlet port 159 in the line b, so that the piston 93 is moved to its lowered position, while in positions 9 to 16 this port 133ª is in communication with the outlet passage 157 through the port 160 along the line b, and the piston 93 is moved to its raised position. In the No. 1 position the second cylinder has its upper port 134ª connected to the outlet passage 157 through the outlet port 160 along the line d, while its lower port 140ª is connected to the inlet port 156 through the inlet port 159 along the line c, and the piston 94 is therefore moved to its upper position. The third cylinder has its upper port 135ª connected to the inlet passage 156 through the port 159 along the line f, while its lower port 141ª is connected to the outlet passage 157 through the port 160 along the line e, and the piston 95 is therefore moved to its lowered position. The fifth cylinder has its upper port 137ª connected to the outlet passage 157 through the port 160 along the line j, while its lower port 143ª is connected to the inlet passage 156 through the port 159 and its extension 159ª along the line i, and the piston 97 is moved to its raised position. The sixth cylinder has its upper port 138ª connected to the inlet passage 156 through the port 159 along the line l, while its lower port 144ª is connected to the outlet passage 157 through the port 160 along the line k, and the piston 98 is moved to its lower position. The particular arrangement shown for the first, second and third, and fifth and sixth pistons in the number two position, is such that the first piston is lowered, the second piston is raised, the third piston is lowered, the fifth piston is lowered and the sixth piston is lowered. The arrangement of the passages is such that in the sixteen different positions of adjustment of the valve member, sixteen different combinations of the cylinders and therefore sixteen different speed arrangements of the gears connected thereto are produced. While only two of the sixteen different positions are described in detail above, the relative arrangement of the upper and lower ports of the six cylinders with respect to the inlet and outlet passages in the other fourteen positions will be clear from the diagrammatic plan Fig. 6, and the arrangement can of course be of different designs to suit any particular requirements.

In order to adjust the position of the rotatable valve member the same is provided at its outer end with a central projecting stud shaft portion 161, upon which there is secured a beveled gear 162 meshing with a beveled gear 163 provided at one end of a shaft 164 journaled in suitable bearing 165 in the frame 16, and extending to the forward side of the machine where further beveled gears 166 and 167 form an operative connection with a short shaft 168, upon which is provided a crank handle 169 having an index portion 170 cooperating with a stationary dial 171 secured upon the base 10. By turning the crank 169 it will be seen that the valve member is rotated, the indications upon the dial showing the setting with respect to the cylinders. It is obvious of course that the present showing with sixteen settings is an arbitrary one, and that any desirable speed change capacity may be provided. A constant pressure of the fluid is maintained, of thirty pounds, for example, so that the mechanism remains in the set positions until a change is desired, the pressure being preferably regulated by adjusting the valve 155. In machine tool use the setting will remain unchanged during relatively long periods, that is, while operating on a particular character of work. While the invention is illustrated as being operated by fluid pressure as oil, compressed air or other suitable medium may be employed. The construction of the valve is such that the pressure is maintained without leakage and with a minimum of packing.

We have illustrated and described a preferred and satisfactory embodiment of the invention but it will be obvious that changes may be made within the spirit and scope thereof as described in the appended claims.

What we claim and desire to secure by Letters Patent is:—

1. In a change speed gear mechanism, transmission gearing including a plurality of gears mounted co-axially and adapted to be shifted, a plurality of parallel fluid pressure cylinders, a piston in each of said cylinders, means connecting said respective pistons to said respective gears whereby the latter are shifted upon movement of said pistons, said cylinders having ports at each end, a cylindrical valve chamber, a cylindrical rotary valve therein having an inlet passage, a plurality of longitudinally spaced radial ports connected with said inlet ports, and a plurality of longitudinal fluid pressure outlet passages having a plurality of longitudinally spaced radial ports connected with said piston cylinders whereby upon rotative adjustment of said valve means the pistons are adapted to be selectively moved in either direction.

2. In a change speed gear mechanism, transmission gearing including a plurality of gears mounted co-axially and adapted to be shifted, a plurality of parallel fluid pressure cylinders, a piston in each of said cylinders, means connecting said respective pistons to said respective gears whereby the latter are shifted upon movement of said pistons, said cylinders having ports at each end, a cylindrical valve chamber, a cylindrical rotary valve therein having a central longitudinally extending passage, a plurality of longitudinally spaced radial ports connected with said central passage and adapted to register with said cylinder inlet ports, and a plurality of fluid pressure outlet passages having a plurality of longitudinally spaced ports connected with the outlet ports of said piston cylinders whereby upon rotative adjustment of said valve means the pistons are adapted to be selectively moved in either direction.

3. In a change speed gear mechanism, transmission gearing including a plurality of gears mounted co-axially and adapted to be shifted, a plurality of parallel fluid pressure cylinders, a piston in each of said cylinders, means connecting said respective pistons to said respective gears whereby the latter are shifted upon movement of said pistons, said cylinders having ports at each end, a cylindrical valve chamber, a cylindrical rotary valve therein having a central longitudinally extending passage, a plurality of longitudinally spaced radial ports connected with said central passage and adapted to register with said cylinder ports, and a plurality of longitudinal fluid pressure outlet passages positioned between said radially extending ports and having a plurality of longitudinally spaced radial ports connected with said piston cylinders whereby upon rotative adjustment of said valve means the pistons are adapted to be selectively moved in either direction.

4. In a change speed gear mechanism, transmission gearing including a plurality of gear means adapted to be shifted, a plurality of fluid pressure cylinders, a piston in each of said cylinders, means connecting said pistons to said gear means whereby the latter are shifted upon movement of said pistons, a cylindrical valve chamber, means for admitting fluid pressure at one end thereof, said cylinders each having ports at each end extending to said valve chamber, said ports being longitudinally spaced, rotary valve means engaged in said chamber having a central longitudinally extending passage connected at one end to the pressure receiving end of said chamber and closed at its other end, said valve means having a plurality of longitudinally spaced radial pressure inlet ports connected to said central passage and adapted to register with said cylinder inlet ports, a plurality of longitudinal fluid pressure outlet passages surrounding said central passage closed at one end and open at their other ends opposed to the pressure receiving end of said chamber, and said valve means having a plurality of longitudinally spaced outlet ports extending from said outlet passages to the peripheral surface and adapted to register with said plurality of cylinder ports, said inlet ports extending radially between said longitudinally extending passages, whereby upon rotative adjustment of said valve means the pistons are adapted to be selectively moved in either direction.

Signed at Bridgeport in the county of Fairfield and State of Connecticut this 20th day of November, A. D. 1925.

FRANK H. MUSSLER.
EDWARD C. BULLARD.